US010069737B2

(12) United States Patent
Bao et al.

(10) Patent No.: US 10,069,737 B2
(45) Date of Patent: Sep. 4, 2018

(54) APPLYING POLICIES BASED ON UNIQUE CONTENT IDENTIFIERS

(71) Applicant: Verizon Patent and Licensing Inc., Arlington, VA (US)

(72) Inventors: Guanqun Bao, Sunnyvale, CA (US); Manish Sharma, San Jose, CA (US); Devin Blong, Penngrove, CA (US); Kevin Flores, San Jose, CA (US); Tushar Chaudhary, San Francisco, CA (US); Gaurav Gupta, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 150 days.

(21) Appl. No.: 14/584,299

(22) Filed: Dec. 29, 2014

(65) Prior Publication Data

US 2016/0191395 A1 Jun. 30, 2016

(51) Int. Cl.

| | |
|---|---|
| ***H04L 12/813*** | (2013.01) |
| ***H04W 4/18*** | (2009.01) |
| *H04L 12/851* | (2013.01) |
| *H04L 12/833* | (2013.01) |

(52) U.S. Cl.

CPC ............... *H04L 47/20* (2013.01); *H04W 4/18* (2013.01); *H04L 47/2441* (2013.01); *H04L 47/31* (2013.01)

(58) Field of Classification Search

None

See application file for complete search history.

(56) References Cited

U.S. PATENT DOCUMENTS 6,574,611 B1 * 6/2003 Matsuyama ............ G06F 21/10 380/30
2010/0064341 A1 * 3/2010 Aldera .................. H04L 63/102 726/1
2010/0208590 A1 * 8/2010 Dolganow ........... H04L 43/026 370/235
2012/0023217 A1 * 1/2012 Wakumoto ............. H04L 47/10 709/223
2012/0198022 A1 * 8/2012 Black .................. H04L 67/1097 709/217
2013/0054800 A1 * 2/2013 Fernandez Alonso ....................... H04L 67/2842 709/224
2013/0238473 A1 * 9/2013 Fan ........................ G06Q 30/04 705/34
2014/0006597 A1 * 1/2014 Ganguli ................ G06F 9/5072 709/224
2014/0341109 A1 * 11/2014 Cartmell ............... H04L 45/308 370/328
2014/0372591 A1 * 12/2014 Payette ................. H04L 67/141 709/223
2015/0207888 A1 * 7/2015 Swanson ........... G06F 17/30914 709/219

(Continued)

*Primary Examiner* — Nicholas Sloms

(57) ABSTRACT

A first server device may receive, from a second server device, a unique identifier (ID) relates to content stored by the second server device; determine a policy based on the unique ID; generate a policy tag identifying the determined policy; and output the policy tag to the second server device. Outputting the policy tag may cause the second server device to apply the policy tag to a packet associated with the content, and output the packet towards a requesting user device that requests the content.

20 Claims, 11 Drawing Sheets

(56) References Cited

U.S. PATENT DOCUMENTS

| | | | | |
|---|---|---|---|---|
| 2015/0222633 | A1* | 8/2015 | Smith | H04L 63/10<br>726/29 |
| 2015/0326528 | A1* | 11/2015 | Murthy | H04L 45/00<br>726/1 |

* cited by examiner

400

| Unique ID | Content Attributes | | | | |
|---|---|---|---|---|---|
| | URI | IP Address | Customer | Content Type | Service Level |
| 123 | URI 1 | 111.111.111.111 | ABC Inc. | Video | 2 |
| 456 | URI 2 | 111.111.111.112 | DEF Corp. | Audio Only | 4 |
| 789 | URI 3 | 111.111.111.113 | GHI, LLC | Image | 3 |
| 012 | URI 4 | 111.111.111.114 | JKL | Gaming | 1 |

Fig. 4

APPLYING POLICIES BASED ON UNIQUE CONTENT IDENTIFIERS

BACKGROUND

Network service providers may utilize various network management techniques to mitigate network congestion. For example, deep-packet inspection ("DPI") techniques may be used to examine a packet being transmitted through the network, and identify transmission policies indicating how the packet should be treated and/or prioritized during transmission. For example, DPI may be used to identify video traffic, call traffic, etc.

BRIEF DESCRIPTION OF THE DRAWINGS

FIG. 4 illustrates an example data structure that may store content attributes for content associated with a unique ID;

DETAILED DESCRIPTION OF THE PREFERRED EMBODIMENTS

The following detailed description refers to the accompanying drawings. The same reference numbers in different drawings may identify the same or similar elements.

Deep packet inspection (DPI) techniques may be ineffective in examining a packet when the data in a packet is encrypted. Thus, network congestion management may suffer, as transmission policies may not be properly applied to encrypted packets.

Systems and/or methods, as described herein, may obtain the attributes of encrypted content without utilizing DPI techniques. For example, the attributes of the content may be determined based on a unique identifier (ID) of the content. Once the attributes have been determined, a transmission policy for packets of the content may be determined based on the attributes. The packets may be "tagged" with information identifying the policy. Network devices may identify the tag, and implement the policy when transmitting the packet towards its destination. As a result, transmission policies may be applied to packets of encrypted content without the use of DPI techniques.

Figure 1:
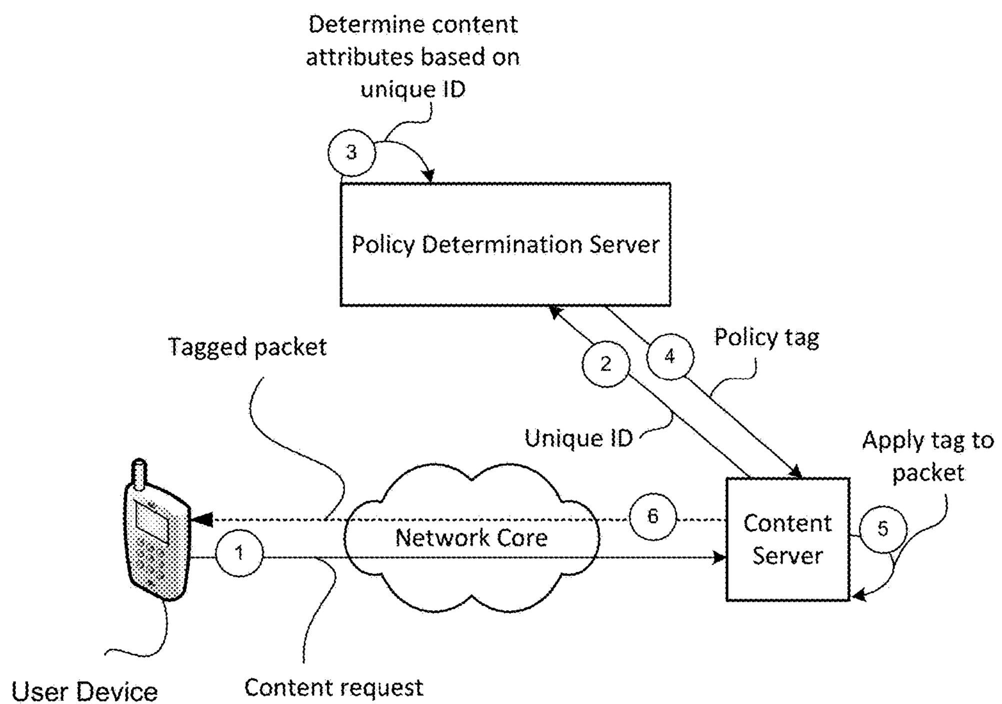
FIG. 1 illustrates an example overview of an implementation described herein.

FIG. 1 illustrates an example overview of an implementation described herein. As shown in FIG. 1, a user device may request content from a content server (arrow 1). For example, a user of the user device may request content from the content server via an application, selection of a link on a webpage, entry of a webpage address, etc. Based on receiving the content request, the content server may output a unique ID associated with the requested content, to a policy determination server (arrow 2). As an example, the content server may store advertising content that a user of the user device may request. The content server may implement a servlet that may be linked to the advertising content. The servlet may output, to the policy determination server, the unique ID associated with the advertising content when the content is requested by the user device (e.g., when the user of the user device selects an ad banner linked to the advertising content). Alternatively, the content server may store other types of content that the user may request via the user device (e.g., images, videos, webpages, etc.).

Based on receiving the unique ID, the policy determination server may determine attributes of a packet associated with the content based on the unique ID (arrow 3). For example, the policy determination server may determine attributes, such as the type of content associated with the packet (e.g., video traffic, audio traffic, voice over Internet Protocol (VoIP) traffic, etc.), a uniform resource identifier (URI) address via which the content may be accessed, and/or other attributes of the packet. In some implementations, the policy determination server may look up the unique ID in a data structure that stores information associating the unique ID with the packet attributes. As described in greater detail below, information stored by the data structure may be based on a registration process that associates the unique ID with the packet attributes.

Based on the packet attributes, the policy determination server may determine a policy for the packet, and output, to the content server, a tag indicative of the policy (arrow 4). The policy may correspond to a set of instructions that indicate, to network devices, how the packet should be treated and/or prioritized during transmission of the packet. For example, the tag may identify a policy relating to a Quality of Service ("QoS"), a QOS Class Identifier ("QCI"), a priority value for a packet queuing algorithm, and/or other information identifying how the packet should be treated and/or prioritized during transmission of the packet.

The content server may receive the tag, and apply the tag to the packet (arrow 5). The tag may be encrypted and/or hashed to prevent the content server from "spoofing" the priority tag. The content server may then output the tagged packet towards the user device via the network core (arrow 6). During transmission of the tagged packet, one or more network devices within the network core may identify that the packet is tagged, and identify the policy associated with the tag, and transmit the packet in accordance with the policy. As such, DPI may not be required to apply a policy to the packet. Thus, when the packet contains encrypted data, a policy for the packet may be determined based on the tag without the need for DPI to be performed. In some implementations, unencrypted packets may be tagged, thereby reducing or eliminating the need for network devices to perform DPI and thus reducing processing associated with DPI.

For outgoing traffic from the user device, the user device may perform similar functions to those described for the content server. For example, the user device may output, to the policy determination server, a unique ID associated with the traffic, obtain a tag based on attributes associated with the unique ID, apply the tag to packets associated with the traffic, and output the tagged packets, whereby network devices may transmit the packets in accordance with a policy associated with the tag.

Figure 2A:
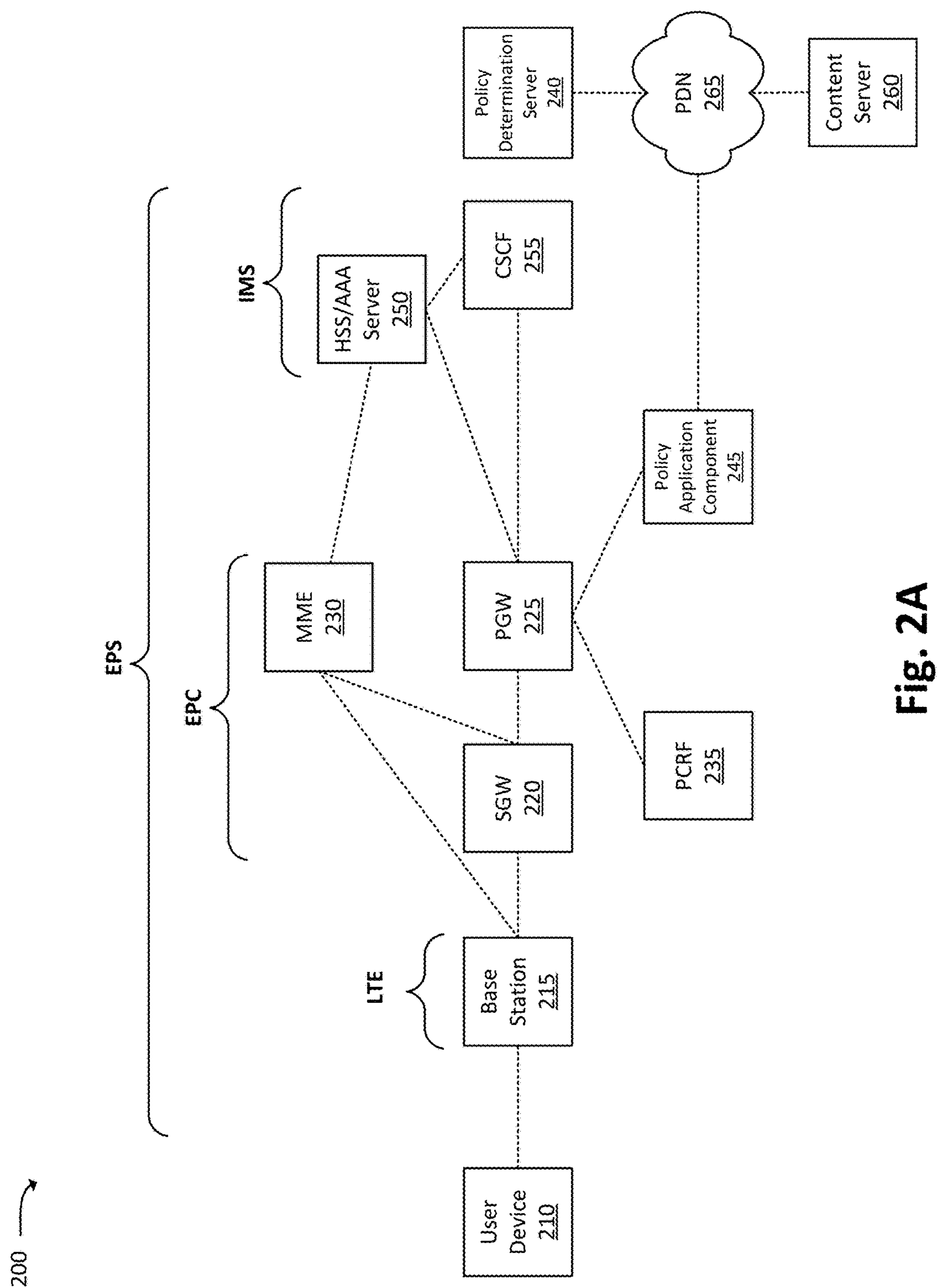
FIGS. 2A-2B illustrate example environments in which systems and/or methods, described herein, may be implemented.
Figure 2B:
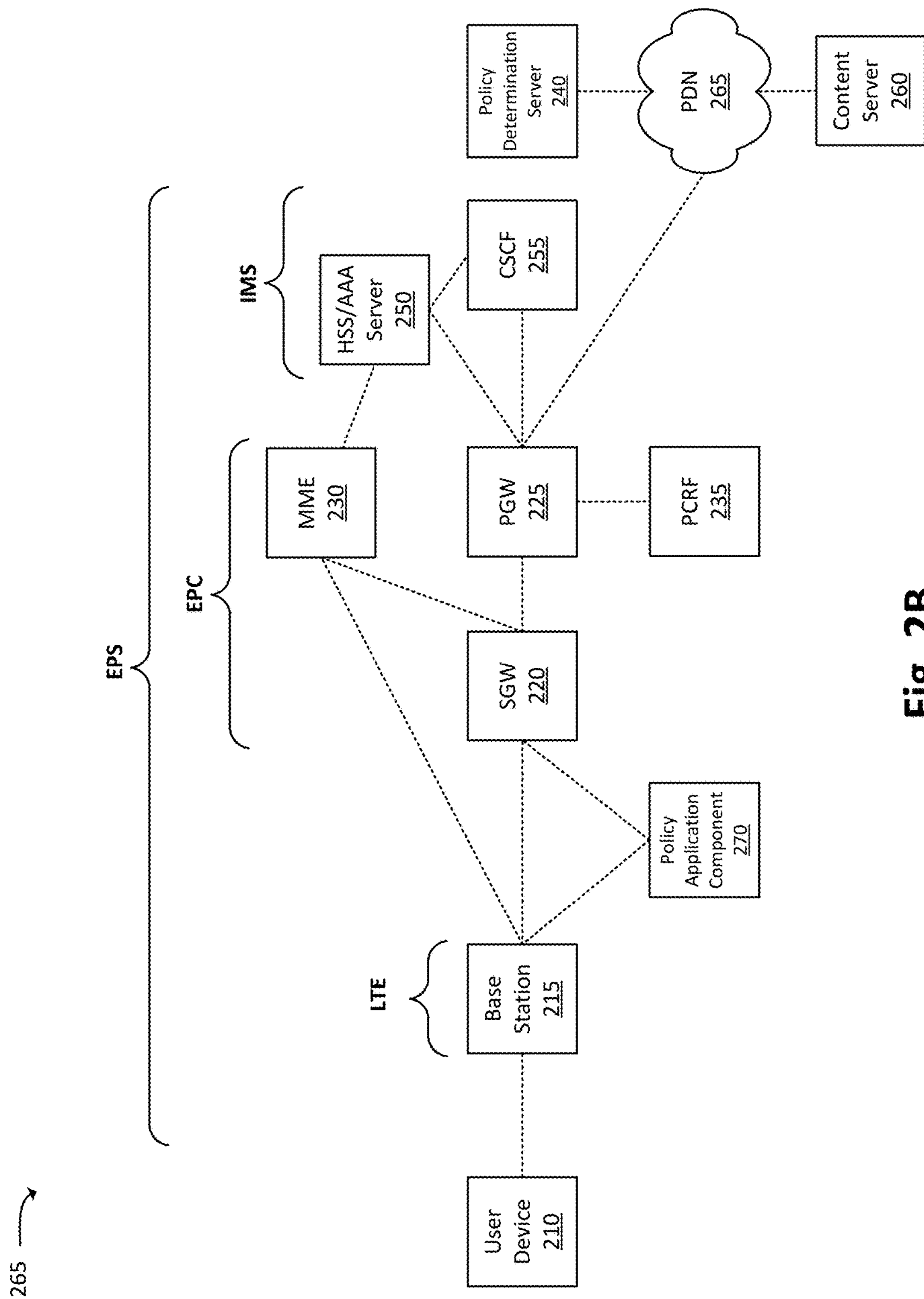

FIG. 2A is a diagram of an example environment 200 in which systems and/or methods described herein may be implemented. As shown in FIG. 2, environment 200 may include user device 210, base station 215, serving gateway ("SGW") 220, packet data network ("PDN") gateway ("PGW") 225, mobility management entity device ("MME") 230, policy and charging rules function ("PCRF") 235, policy determination server 240, policy application component 245, home subscriber server ("HSS")/authentication, authorization, accounting ("AAA") server 250 (hereinafter referred to as "HSS/AAA server 250"), call server control function ("CSCF") 255, content server 260, and PDN 265.

Environment 200 may include an evolved packet system ("EPS") that includes a long term evolution (LTE) network, an evolved packet core ("EPC"), and/or an Internet protocol ("IP") multimedia subsystem ("IMS") core that operate based on a third generation partnership project ("3GPP") wireless communication standard. The LTE network may be a radio access network ("RAN") that includes one or more base stations, such as eNodeBs ("eNBs"), via which user device 210 communicates with the EPC. The EPC may include SGW 220, PGW 225, and/or MME 230, and may enable user device 210 to communicate with network 280 and/or the IMS core. The IMS core may include HSS/AAA server 250 and/or CSCF 255. The IMS core may manage authentication, connection initiation, account information, a user profile, etc. associated with user device 210.

User device 210 may include any computation or communication device, such as a wireless mobile communication device that is capable of communicating with base station 215 and/or a network (e.g., PDN 265). For example, user device 210 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from PDN 265.

Base station 215 may include one or more network devices that receive, process, and/or transmit traffic, such as audio, video, text, and/or other data, destined for and/or received from user device 210. In an example implementation, base station 215 may be an eNB device and may be part of the LTE network. Base station 215 may receive traffic from and/or send traffic to PDN 265 via SGW 220 and PGW 225. Base station 215 may send traffic to and/or receive traffic from user device 210 via an air interface. One or more of base stations 220 may be associated with a RAN, such as the LTE network.

SGW 220 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 220 may, for example, aggregate traffic received from one or more base stations 220 and may send the aggregated traffic to network 280 via PGW 225. In one example implementation, SGW 220 may route and forward user data packets, may act as a mobility anchor for a user plane during inter-eNB handovers, and may act as an anchor for mobility between LTE and other 3GPP technologies.

PGW 225 may include one or more network devices, such as a gateway, a router, a modem, a switch, a firewall, a NIC, a hub, a bridge, a proxy server, an OADM, or some other type of device that processes and/or transfers traffic. PGW 225 may, for example, provide connectivity of user device 210 to external packet data networks by being a traffic exit/entry point for user device 210. PGW 225 may perform policy enforcement, packet filtering, charging support, lawful intercept, and/or packet screening. PGW 225 may also act as an anchor for mobility between 3GPP and non-3GPP technologies.

MME 230 may include one or more network devices that perform operations associated with a handoff to and/or from the EPS. MME 230 may perform operations to register user device 210 with the EPS, to handoff user device 210 from the EPS to another network, to handoff a user device 210 from the other network to the EPS, and/or to perform other operations. MME 230 may perform policing operations for traffic destined for and/or received from user device 210. MME 230 may authenticate user device 210 (e.g., via interaction with HSS/AAA server 250).

PCRF 235 may include one or more devices that aggregate information to and from the EPC network and/or other sources. PCRF 235 may receive information regarding policies and/or subscriptions from one or more sources, such as subscriber databases and/or from one or more users (such as, for example, an administrator associated with PCRF 235).

Policy determination server 240 may include one or more computing devices, such as a server device or a collection of server devices, which may store information associating a unique ID to packet attributes. Policy determination server 240 may determine a policy based on packet attributes and/or based on other factors. Policy determination server 240 may generate a tag indicative of a policy, and output the tag to content server 260.

Policy application component 245 may include one or more network devices which may apply a policy to packet. For example, policy application component 245 may apply the policy based on a tag included in a header of the packet. If a packet does not include a tag, policy application component 245 may perform DPI to obtain packet attributes, and determine a policy for the packet based on the packet attributes. Policy application component 245 may assign a queuing order and/or bandwidth levels for packets based on the policy, and may output the packet towards user device 210 via the EPC. In some implementations, policy application component 245 may be an "in-line" network device. For example, policy application component 245 may receive traffic from PDN 265, may prioritize the traffic, and output the traffic to PGW 230.

HSS/AAA server 250 may include one or more computing devices, such as a server device or a collection of server devices. In some implementations, HSS/AAA server 250 may include a device that gathers, processes, searches, stores, and/or provides information in a manner described herein. For example, HSS/AAA server 250 may manage, update, and/or store, in a memory associated with HSS/AAA server 250, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 250 may include a device that performs authentication, authorization, and/or accounting (AAA) operations associated with a communication connection with user device 210.

CSCF 255 may include one or more computing devices, such as a server device or a collection of server devices that may process and/or route calls to and from user device 210 via the EPC. For example, CSCF 255 may process traffic, received from PDN 265, that is destined for user device 210. In another example, CSCF 255 may process traffic, received from user device 210, that is destined for PDN 265.

Content server 260 may include one or more computing devices, such as a server device or a collection of server devices associated with a content provider that may provide content to user device 210. In some implementations, content server 260 may be associated with a web server that hosts webpages and/or other content. Additionally, or alternatively, a link to content stored by content server 260 may be presented within an application or webpage associated with a different web server or application server. Content server 260 may store multiple different types of content (e.g., images, videos, audio, etc.). Content server 260 may receive a tag from policy determination server 240 (e.g., based on outputting a unique ID associated with requested content), apply the tag to packets associated with the requested content, and output the tagged packets towards user device 210.

PDN 265 may include one or more wired and/or wireless networks. For example, PDN 265 may include a cellular network (e.g., a second generation ("2G") network, a third generation ("3G") network, a fourth generation ("4G") network, a fifth generation ("5G") network, a long-term evolution ("LTE") network, a global system for mobile ("GSM") network, a code division multiple access ("CDMA") network, an evolution-data optimized ("EVDO") network, or the like), a public land mobile network ("PLMN"), and/or another network. Additionally, or alternatively, PDN 265 may include a local area network ("LAN"), a wide area network ("WAN"), a metropolitan network ("MAN"), the Public Switched Telephone Network ("PSTN"), an ad hoc network, a managed Internet Protocol ("IP") network, a virtual private network ("VPN"), an intranet, the Internet, a fiber optic-based network, and/or a combination of these or other types of networks.

The quantity of devices and/or networks in environment 200 is not limited to what is shown in FIG. 2A. In practice, environment 200 may include additional devices and/or networks; fewer devices and/or networks; different devices and/or networks; or differently arranged devices and/or networks than illustrated in FIG. 2A. For example, referring to environment 265 in FIG. 2B, policy application component 270 may receive uplink traffic from user device 210, apply a policy to a packet for the uplink traffic, and output the traffic to SGW 220. Also, in some implementations, one or more of the devices of environments 200 and/or 265 may perform one or more functions described as being performed by another one or more of the devices of environments 200 and/or 265. Devices of environments 200 and/or 265 may interconnect via wired connections, wireless connections, or a combination of wired and wireless connections. Also, policy application component 245 and/or policy application component 270 may be incorporated within SGW 220, PGW 225, and/or within another device.

Figure 3:
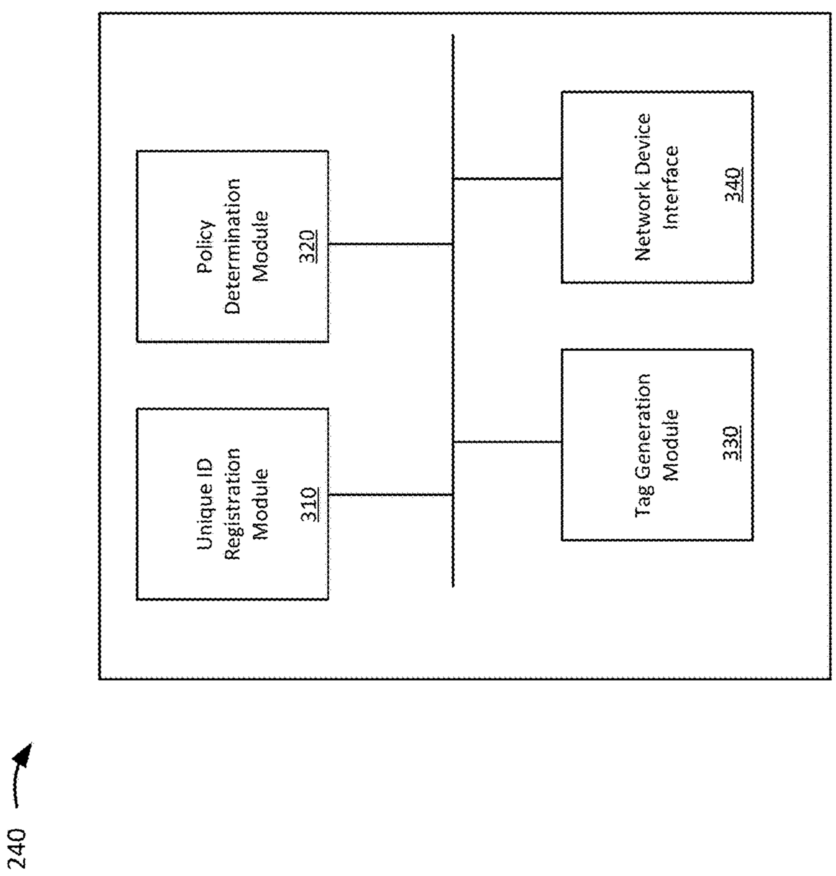
FIG. 3 illustrates example functional components of a policy determination server.

FIG. 3 illustrates example functional components of a policy determination server. In some other implementations, functional components shown in FIG. 3 may be implemented by one or more devices, which include or exclude policy determination server 240. For example, PGW 225, PCRF 235, and/or policy application component 245 may include some or all of the functional components shown in FIG. 3.

As shown in FIG. 3, policy determination server 240 may include unique ID registration module 310, policy determination module 320, tag generation module 330, and/or network device interface 340. Unique ID registration module 310 may store information associating a unique ID with attributes of registered content. For example, an administrator of content server 260 may register particular content with policy determination server 240. In order to register the particular content, the administrator may request to register the particular content (e.g., via a registration portal, a registration on-boarding application, etc.). Also, the attributes of the particular content may be provided via the registration portal (e.g., the type of content, a URI and/or URL address via which the content may be accessed, an IP address of content server 260, an ID or description of an organization associated with content server 260, and/or other attributes of the particular content). In some implementations (e.g., via the registration portal), a service level may be selected for the transmission of the content. For example, a relatively higher service level may be selected to prioritize the transmission of the content over the transmission of other content. In some implementations, the service level may be based on a service level agreement ("SLA") between a party associated with content server 260 and with policy determination server 240. In some implementations, the service levels may be associated with a corresponding fee. Unique ID registration module 310 may assign a unique ID to the particular content, and store a data structure that reflects the unique ID of the content to the attributes of the content. Unique ID registration module 310 may output the unique ID to content server 260, and content server 260 may link the unique ID to a servlet associated with the content.

Policy determination module 320 may receive a unique ID from content server 260, and may communicate with unique ID registration module 310 to obtain attributes corresponding to the unique ID. Based on the content attributes, policy determination module 320 may determine a policy for the content. For example, the content attributes may identify an owner of the content, a URI and/or URL associated with the content, and/or other information. Based on these attributes, policy determination module 320 may identify an SLA corresponding to a policy. Additionally, or alternatively, the content attributes may identify a type of the content based on which policy determination module 320 may determine a policy. In some implementations, policy determination module 320 may determine the policy based on other factors in addition to, or in lieu of, the content attributes. For example, policy determination module 320 may determine the policy based on a time of day, a measure of network load, and/or other factors.

In some implementations, the policy may relate to a QoS policy, a QCI, queuing parameters, throughput limits (e.g., minimum or maximum throughputs), and/or other information indicating how a packet should be treated during transmission. For example, the policy may indicate that video and/or image content should be compressed or transmitted at a lower resolution. As another example, a policy may indicate that particular content should be transmitted at a maximum or minimum bitrate. Additionally, or alternatively, the policy may indicate a priority level, which may be used as a parameter for a queuing algorithm.

In some implementations, the priority value may be based on a scoring algorithm. For example, streaming video content may be scored relatively higher than text or image content. Also, content of a relatively higher subscription level may be scored relatively higher. Additionally, or alternatively, the scoring may be based on other factors. For example, at different times of day, different types of content may be scored differently. Also, the subscription level may affect the score differently for different types of content. In some implementations, the priority value may be a single value, such as 0, 1, 2, 3, etc. indicative of the priority for the transmission of packets of content.

Tag generation module 330 may receive information identifying a policy from policy determination module 320, and may generate a tag identifying the policy. For example, tag generation module 330 may input a value corresponding to the policy into a cryptographic hash function to generate a hashed policy tag corresponding to the input value. Additionally, or alternatively, tag generation module 330 may encrypt the value and/or the hashed tag. As described in greater detail below, policy application component 245 may receive a packet including the policy tag, decrypt the policy tag to determine the value, and/or compare the hashed tag to a hashed tag lookup table to determine the value associated with the policy tag. Policy application component 245 may then transmit the packet in accordance with the policy corresponding to the value.

Network device interface 340 may output the policy tag to content server 260, so that content server 260 may apply the policy tag to packets associated with content. Network device interface 340 may also interface with content server 260 in order to obtain registration information for content.

FIG. 4 illustrates an example data structure 400 that may store content attributes for content associated with a unique ID. In some implementations, data structure 400 may be stored in a memory of policy determination server 240. In some implementations, data structure 400 may be stored in a memory separate from, but accessible by, policy determination server 240 (e.g., a "cloud" storage device). In some implementations, data structure 400 may be stored by some other device in environment 200, such as policy application component 245 and/or content server 260. A particular instance of data structure 400 may contain different information and/or fields than another instance of data structure 400.

Each entry in data structure 400 may identity a unique ID of particular content registered with content server 260, and attributes of the particular content. For example, data structure 400 may store content attributes, such as a URI of the particular content, an IP address of the particular content, a customer of the particular content (e.g., an owner associated with the particular content and associated with content server 260), a type of the particular content, a service level of the particular content, and/or other attribute associated with the content).

In some implementations, information stored by data structure 400 may be used by policy determination server 240 to determine a policy for the transmission of content based on the attributes of the content. For example, the customer information, URI, and/or IP address may be used to identify an SLA that indicates a policy. Additionally, or alternatively, the content type and/or service level value may be used to determine the policy in the form of a QCI. Additionally, or alternatively, the policy may relate to a QoS level.

In some implementations, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
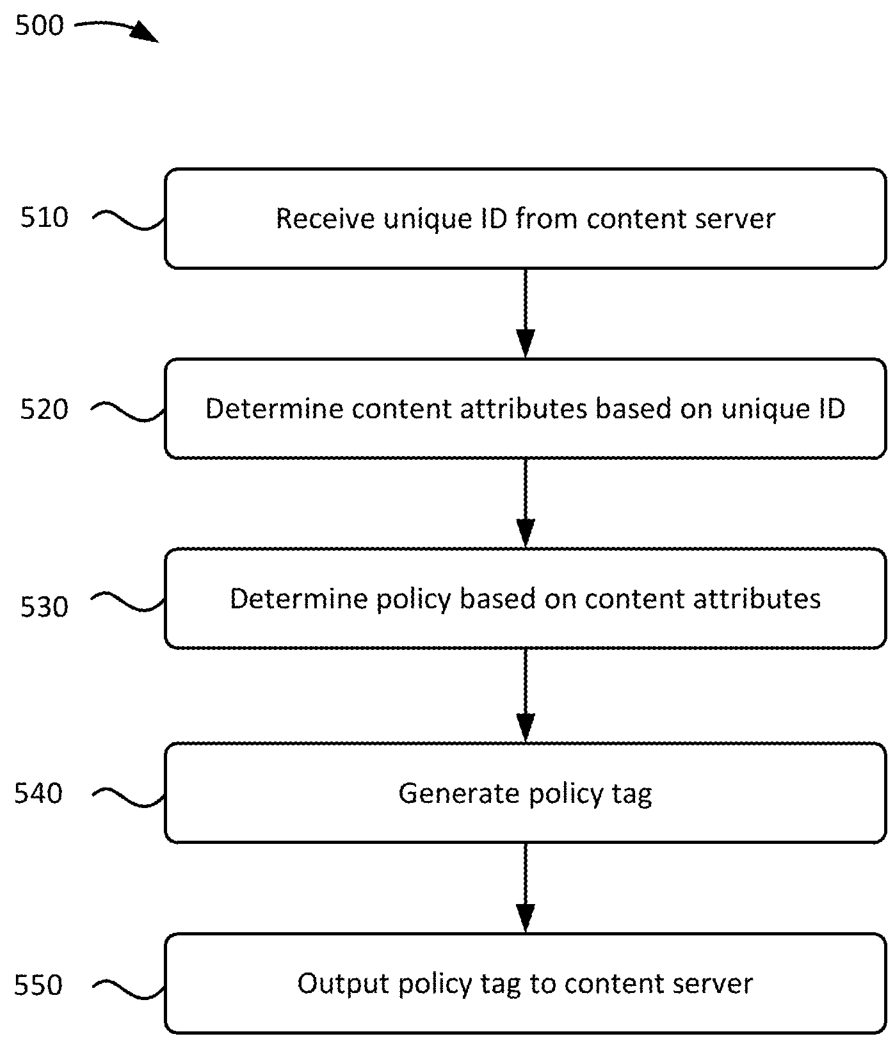
FIG. 5 illustrates a flowchart of an example process for determining a transmission policy for packets associated with selected content based on a unique ID of the selected content.

FIG. 5 illustrates a flowchart of an example process 500 for determining a transmission policy for packets associated with selected content based on a unique ID of the selected content. In some implementations, process 500 may be performed by policy determination server 240. In some implementations, some or all of blocks of process 500 may be performed by one or more other devices.

As shown in FIG. 5, process 500 may include receiving a unique ID from a content server (block 510). For example, policy determination server 240 may receive a unique ID from content server 260. Content server 260 may output the unique ID when a user of user device 210 requests content corresponding to the unique ID. For example, when the content is registered with policy determination server 240, content server 260 may implement a servlet that may be linked to the requested content and with the unique ID of the content. The servlet may output, to policy determination server 240, the unique ID associated with the requested content. In some implementations, different unique IDs may be associated with different user devices 210 for the same content. For example, content server 260 may output one unique ID when particular content is requested by user device 210-1, and output a different unique ID when the same particular content is requested by user device 210-2. The different unique IDs may correspond to different transmission policies for the same content, depending on the requesting user device 210.

Process 500 may also include determining content attributes based on the unique ID (block 520). For example, policy determination server 240 may determine the content attributes based on the unique ID. In some implementations, policy determination server 240 may determine the content attributes by looking up the unique ID in a data structure that stores information associating the unique ID with content attributes (e.g., data structure 400).

Process 500 may further include determining a policy based on the content attributes (block 530). For example, as described above with respect to policy determination module 320, policy determination server 240 may determine a policy based on the content attributes. In some implementations, policy determination server 240 may determine the policy based on an SLA identified by the content attributes (e.g., identify an owner of the content, a URI associated with the content, etc.). Additionally, or alternatively, policy determination server 240 may determine the policy based on content attributes that identify the type of content. In some implementations, policy determination server 240 may determine the policy based on other variables in addition to the content attributes. For example, policy determination server 240 may determine the policy based on a time of day, a measure of network load, and/or other factors.

Process 500 may also include generating a policy tag (block 540). For example, as described above with respect to tag generation module 330, policy determination server 240 may generate the policy tag. In some implementations, policy determination server 240 may input a value corresponding to the policy into a cryptographic hash function to generate a policy tag in the form of a digest corresponding to the input value. Additionally, or alternatively, policy determination server 240 may encrypt the value and/or the digest.

Process 500 may further include outputting the policy tag to the content server (block 550). For example, as described above with respect to network device interface 340, policy determination server 240 may output the policy tag to content server 260. Content server 260 may apply the policy tag to packets associated with content. Content server 260 may then transmit the tagged packets towards user device 210. Policy application component 245 may receive the tagged packets en route to user device 210, and transmit the packets towards user device 210 in accordance with the policy identified by the tag.

Figure 6A:
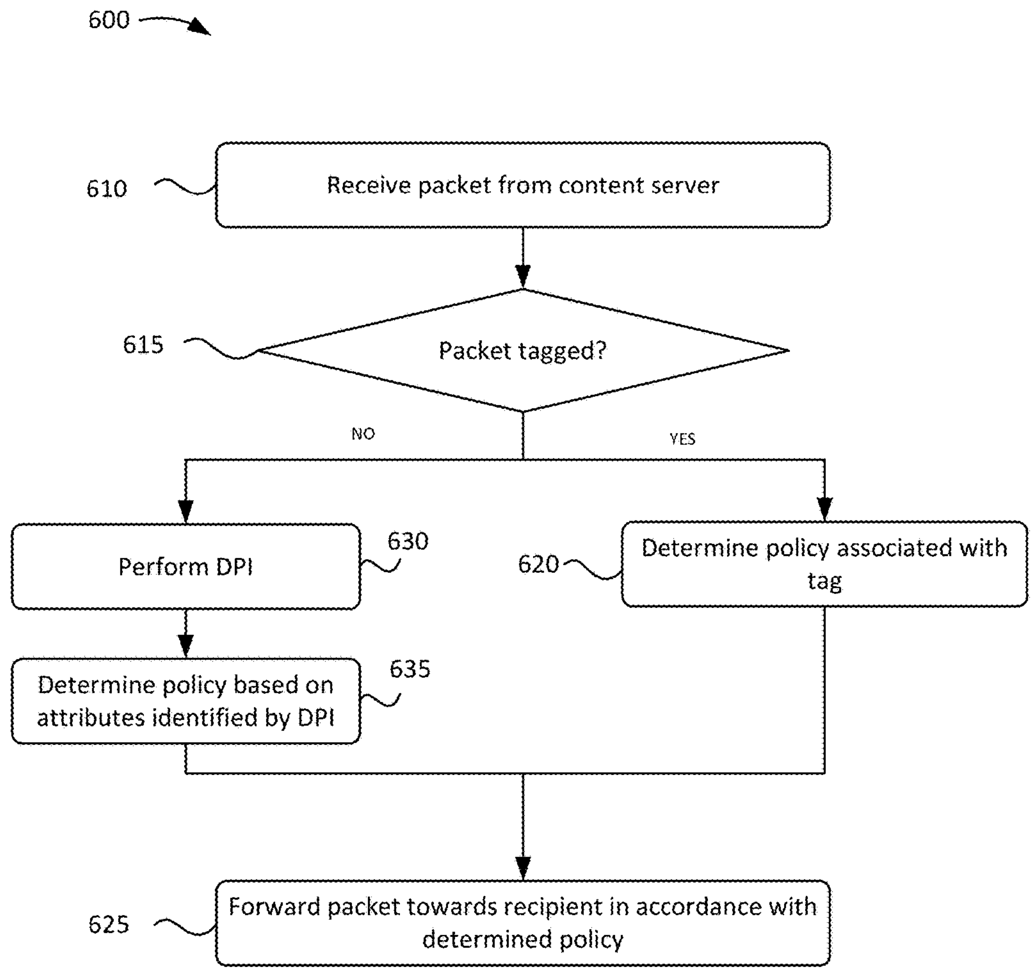
FIGS. 6A-6B illustrate flowcharts of example processes for identifying a policy for a packet based on whether the packet is tagged.
Figure 6B:
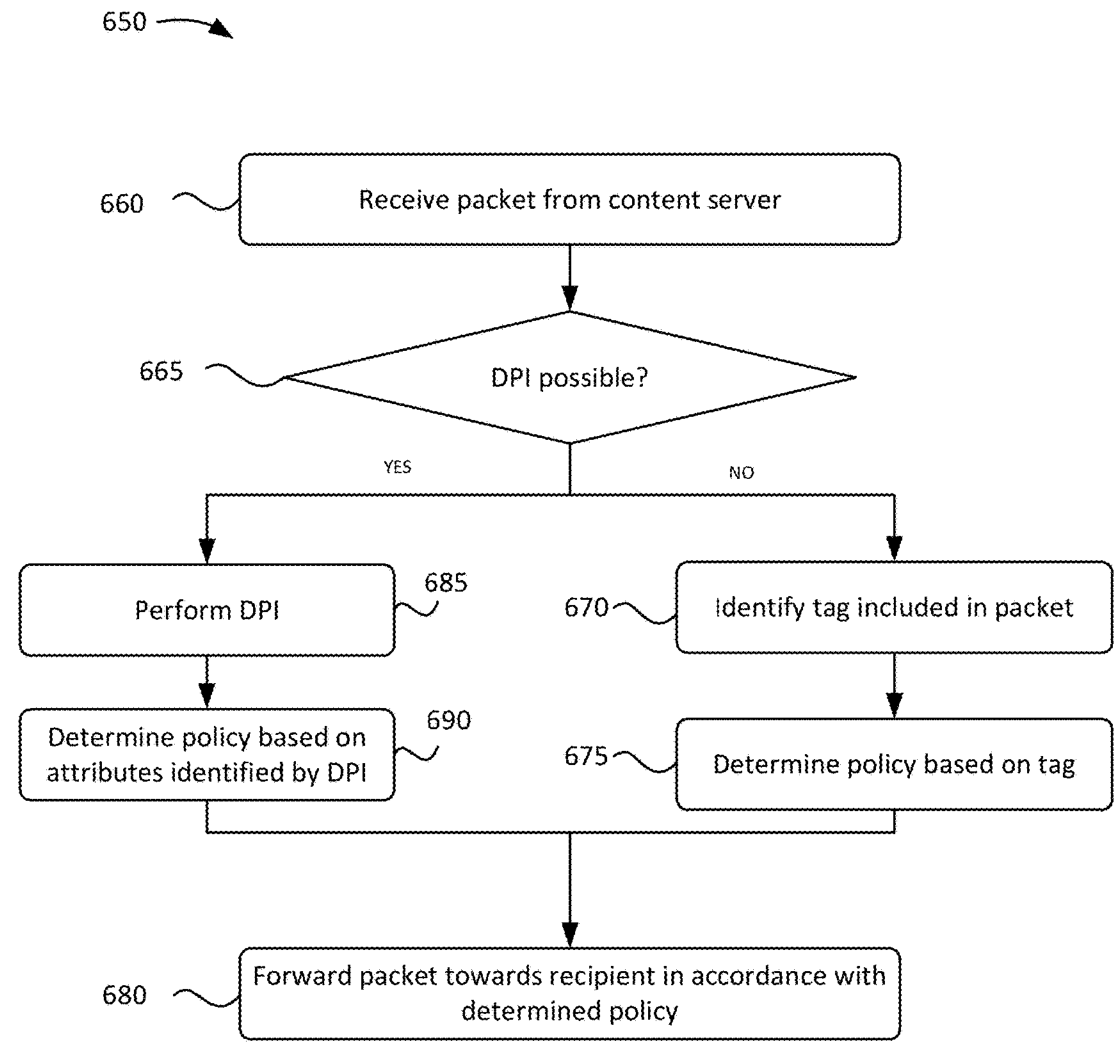

FIGS. 6A-6B illustrate flowcharts of example processes 600 and 650 for identifying a policy for a packet based on whether the packet is tagged. In some implementations, processes 600 and 650 may be performed by policy application component 245. In some implementations, some or all of blocks of processes 600 and/or 650 may be performed by one or more other devices.

As shown in FIG. 6A, process 600 may include receiving a packet from a content server (block 610). For example, policy application component 245 may receive, from content server 260, a packet destined for user device 210. In some implementations, the packet may have been tagged by content server 260 prior to when policy application component 245 receives the packet. For example, as described above with respect to process 500, content server 260 may tag the packet to indicate a policy for the transmission of the packet. Alternatively, content server 260 may not tag the packet.

Process 600 may further include determining whether the packet is tagged (block 615). For example, policy application component 245 may determine that the packet is tagged by examining a header of the packet and identifying that the header includes the tag. Policy application component 245 may determine that the packet is not tagged by examining the header of the packet and identifying that the header does not include the tag.

If, for example, policy application component 245 determines that the packet is tagged (block 615-YES), process 600 may further include determining a policy associated with the tag (block 620). For example, policy application component 245 may determine the policy associated with the tag. As described above, the tag may include a hash value. Policy application component 245 may determine the policy by comparing the hash value with a data structure that identifies policies based on hash values. As an example, if the hash value is "5CX837DS," policy application component 245 may determine, using the data structure, which policy corresponds to the hash value "5CX837DS."

Process 600 may also include forwarding the packet towards a recipient in accordance with the determined policy (block 625). For example, policy application component 245 may forward the packet towards a recipient user device 210 in accordance with the determined policy. As an example, policy application component 245 may prioritize the packet in a packet queue based on the policy. Additionally, or alternatively, policy application component 245 may output the packet in accordance with a QoS parameter. Additionally, or alternatively, policy application component 245 may treat the packet in some other manner based on the policy.

If, on the other hand, the packet is not tagged (block 615-NO), process 600 may include performing DPI (block 630). For example, policy application component 245 may perform DPI on the packet to determine attributes associated with the packet (e.g., type of content associated with the packet, an IP address associated with the packet, a URI associated with the packet, a type of content associated with the packet, etc.).

Process 600 may further include determining a policy based on attributes identified by DPI (block 635). For example, policy application component 245 may determine the policy based on the attributes. In some implementations, policy application component 245 may determine the policy by comparing the attributes with a data structure that identifies policies based on attributes.

Process 600 may also include forwarding the packet towards a recipient in accordance with the determined policy (block 625). For example, policy application component 245 may forward the packet towards a recipient user device 210 in accordance with the determined policy.

Referring to FIG. 6B, process 650 may include receiving a packet from a content server (block 660). For example, policy application component 245 may receive, from content server 260, a packet destined for user device 210. In some implementations, the packet may have been tagged by content server 260 prior to when policy application component 245 receives the packet. For example, as described above with respect to process 500, content server 260 may tag the packet to indicate a policy for the transmission of the packet. Alternatively, content server 260 may not tag the packet.

Process 650 may further include determining whether DPI is possible (block 665). For example, policy application component 245 may determine whether DPI is possible by attempting to perform DPI on the packet. Policy application component 245 may determine DPI is not possible if the packet is encrypted or if DPI otherwise fails. Policy application component 245 may determine that DPI is possible if DPI is successful.

If, for example, policy application component 245 determines that DPI is not possible (block 665-NO), process 650 may further include identifying a tag included in the packet. For example, policy application component 245 may examine a header of the packet to identify the tag.

Process 650 may further include determining a policy associated with the tag (block 675). For example, policy application component 245 may determine the policy associated with the tag.

Process 650 may also include forwarding the packet towards a recipient in accordance with the determined policy (block 680). For example, policy application component 245 may forward the packet towards a recipient user device 210 in accordance with the determined policy.

If, on the other hand, DPI is possible (block 665-YES), process 650 may include performing DPI (block 685). For example, policy application component 245 may perform DPI on the packet to determine attributes associated with the packet.

Process 650 may further include determining a policy based on attributes identified by DPI (block 690). For example, policy application component 245 may determine the policy based on the attributes.

Process 650 may also include forwarding the packet towards a recipient in accordance with the determined policy (block 680). For example, policy application component 245 may forward the packet towards a recipient user device 210 in accordance with the determined policy.

In some implementations, policy application component 245 may determine a policy for a packet based on performing DPI and based on a tag included in the packet. For example, policy application component 245 may determine some attributes of the packet using DPI, and other attributes based on the tag. Policy application component 245 may determine the policy based on the attributes obtained via DPI and via the tag.

Figure 7:
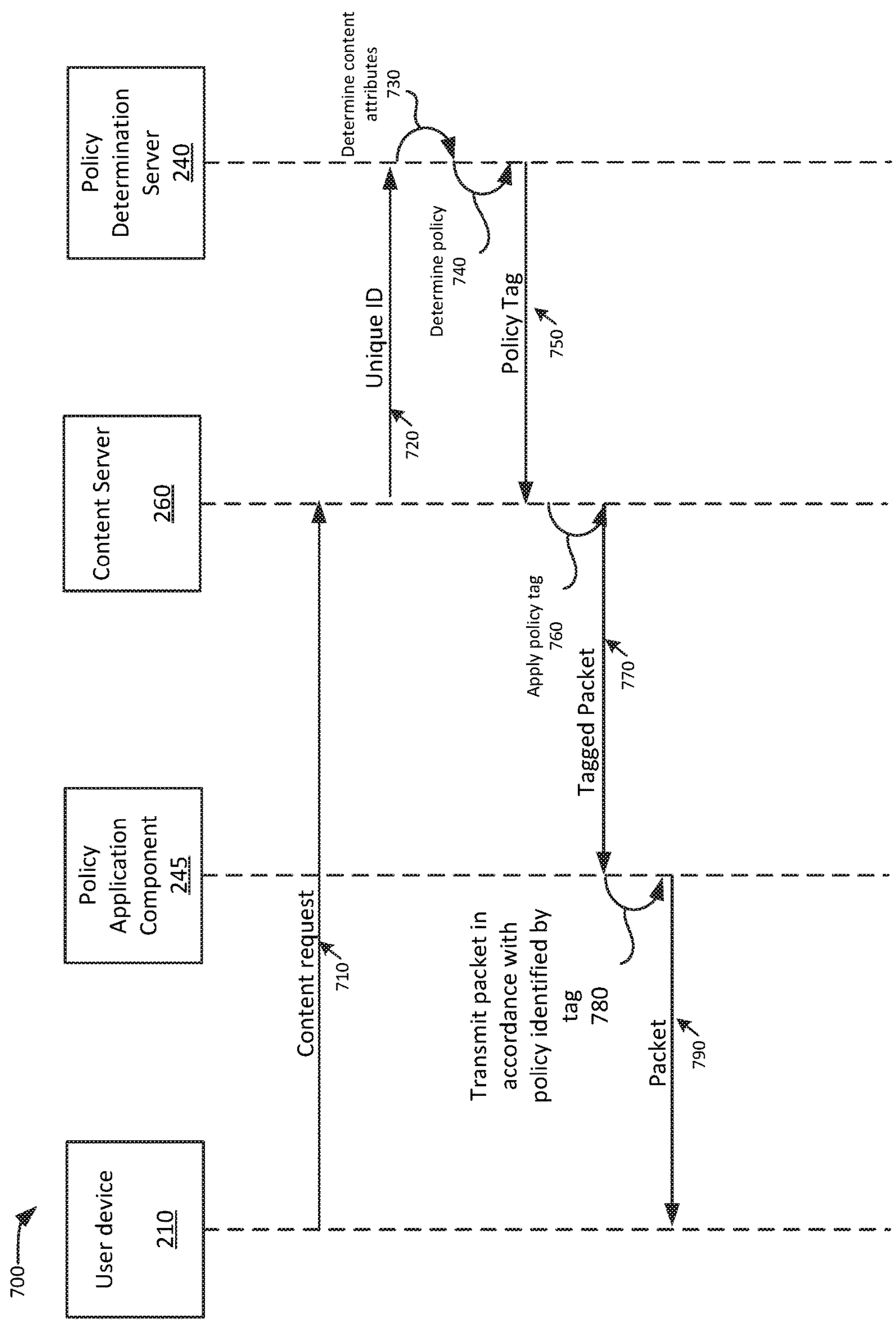
FIG. 7 illustrates a signal flow diagram for transmitting a packet in accordance with a policy identified by a tag.

FIG. 7 illustrates a signal flow diagram for transmitting a packet in accordance with a policy identified by a tag. As shown in FIG. 7, user device 210 may request content (at 710) from content server 260. Based on receiving the content request, content server 260 may output, to content server 260, a unique ID corresponding to the request content (at 720). Based on receiving the unique ID, policy determination server 240 may determine the attributes of the content based on the unique ID (at 730), and determine a policy for the packet based on the attributes (at 740). Policy determination server 240 may output a policy tag that identifies the policy to content server 260 (at 750). Content server 260 may apply the policy tag by storing the tag in a header of the packet (at 760), and output the tagged packet towards user device 210 (at 770). Policy application component 245 may receive the tagged packet, identify the policy associated with the tag, and transmit the packet towards user device 210 in accordance with the identified policy (at 780 and 790).

Figure 8:
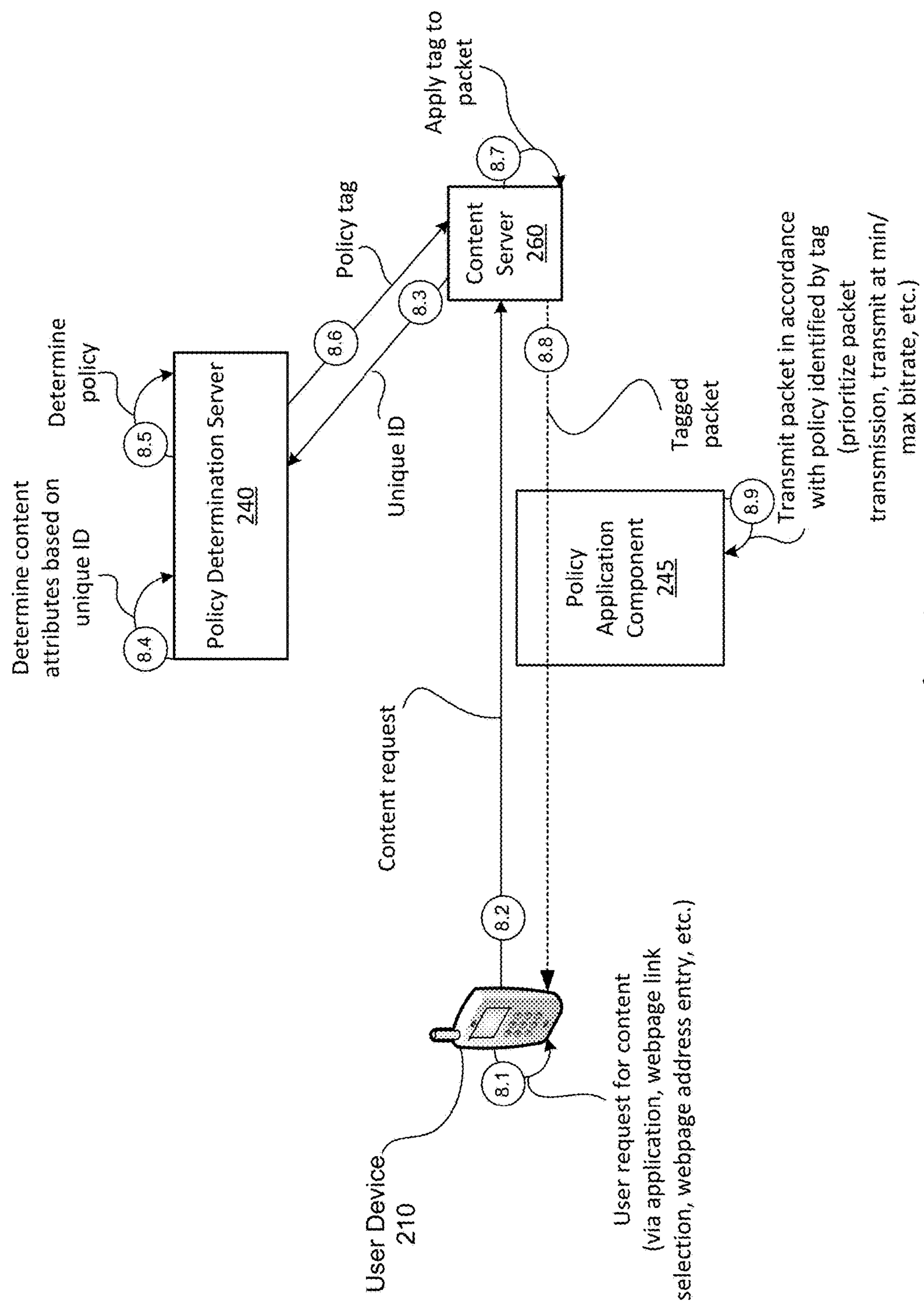
FIG. 8 illustrates an example implementation for transmitting a packet in accordance with a policy identified by a tag.

FIG. 8 illustrates an example implementation for transmitting a packet in accordance with a policy identified by a tag. As shown in FIG. 8, a user of user device 210 may request content from content server 260 (arrow 8.1). For example, the user may request for the content via an application, selection of a webpage link, entry of a webpage address, etc. Based on receiving the request from the user, user device 210 may request the content from content server 260 (arrow 8.2). Content server 260 may output a unique ID corresponding to the request content (arrow 8.3). Based on receiving the unique ID, policy determination server 240 may determine the attributes of the content based on the unique ID (arrow 8.4), and determine a policy for the packet based on the attributes (arrow 8.5). Policy determination server 240 may output a policy tag that identifies the policy to content server 260 (arrow 8.6). Content server 260 may apply the policy tag by storing the tag in a header of the packet (arrow 8.7), and output the tagged packet towards user device 210 (8.8). Policy application component 245 may receive the tagged packet, identify the policy associated with the tag, and transmit the packet towards user device 210 in accordance with the identified policy (arrows 8.9).

As described above, DPI may not be required to apply a policy to a packet. Thus, when the packet contains encrypted data, a policy for the packet may be determined based on the tag without the need for DPI to be performed. In some implementations, unencrypted packets may be tagged, thereby reducing or eliminating the need for network devices to perform DPI and thus reducing processing associated with DPI. Further, DPI may be performed if a packet is not tagged.

Figure 9:
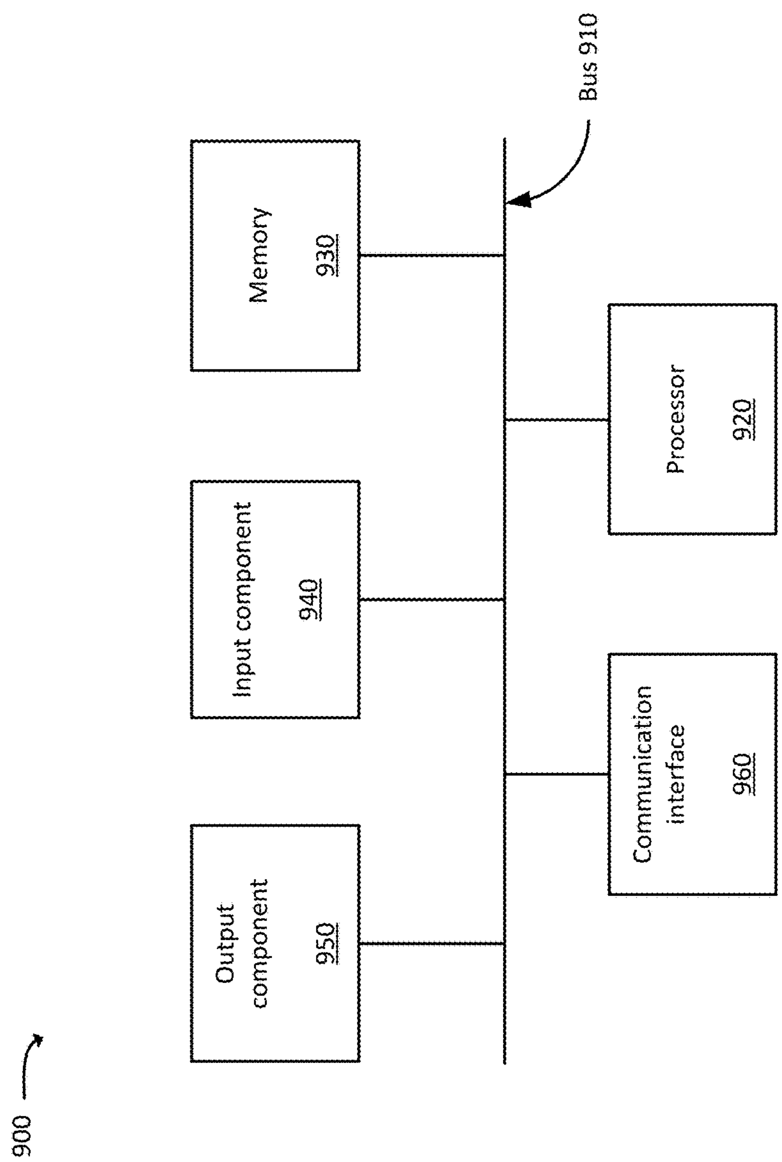
FIG. 9 illustrates example components of one or more devices, according to one or more implementations described herein.

FIG. 9 is a diagram of example components of device 900. One or more of the devices described above (e.g., with respect to FIGS. 1-3, 7, and 8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks and/or signal flows have been described with regard to FIGS. 5-7, the order of the blocks and/or signal flows may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1-3, 7, and 8), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A network device, comprising:

a non-transitory memory device storing a plurality of processor-executable instructions; and a processor configured to execute the processor-executable instructions, wherein executing the processor-executable instructions causes the network device to:

receive a packet destined for a requesting user device, the packet corresponding to a particular content item provided by a content provider, out of a plurality of content items offered by the content provider, wherein each content item, of the plurality of content items, is associated with a unique identifier, wherein the packet includes:

encrypted data that corresponds to a portion of the particular content item, and a tag, in a header of the packet, that was applied by the content provider, the tag including a value that is mapped to:

an identity of the requesting user device, and an identity of the particular content item, wherein the value includes a hash value that was generated using a cryptographic hash function, wherein the value is different from another value that is mapped to an identity of the same particular content item and an identity of another user device, the tag having been applied by the content provider based on a determination by the content provider that the packet includes the encrypted data that corresponds to the particular content item;

determine whether deep packet inspection ("DPI") can be used to inspect contents of the packet;

based on determining whether DPI can be used to inspect the contents of the packet, determine that DPI cannot be used to inspect the encrypted data of the packet;

based on determining that DPI cannot be used to inspect the encrypted data of the packet:

determine a time of day associated with a request for the particular content item by the requesting user device:

determine that the header of the packet includes the tag that was applied by the content provider, the tag including the value that is mapped to:

the identity of the requesting user device, and the identity of the particular content item;

determine a policy, that indicates parameters indicating how the packet should be transmitted to the requesting user device, the policy being determined based on:

decrypting the hash value to determine the identity of the requesting user device and the identity of the particular content item, as indicated by the hash value included in the tag, and the time of day associated with the request for the particular content item; and output the packet towards the requesting user device in accordance with the policy determined based on the value included in contents of the packet or based on the tag.

2. The network device of claim 1, wherein the policy relates to at least one of: a Quality of Service (QoS) policy, or a QoS Class Indicator (QCI).

3. A device, comprising:

a non-transitory memory device storing a plurality of processor-executable instructions; and a processor configured to execute the processor-executable instructions, wherein executing the processor-executable instructions causes the device to:

receive, from a content provider, a unique identifier (ID), the unique ID being associated with:

a particular content item stored by the content provider, the particular content item being one of a plurality of content items stored by the content provider, and an identity of a user device that requested the content from the content provider;

determine a time of day associated with the request for content by the user device;

determine a policy, indicating how the content should be transmitted to the user device, based on:

the unique ID that is associated with the particular content item, the time of day associated with the request for content, and the user device that requested the content;

generate a hash value by applying a cryptographic hash function to a value that is associated with the policy that was determined based on the unique ID and the user device;

generate a policy tag identifying the determined policy, the policy tag including the hash value that is based on the unique ID that is associated with the particular content item and the user device that requested the content; and output the policy tag to the content provider, wherein outputting the policy tag causes the content provider to:

determine that a packet, that includes a portion of the requested content includes the portion of the requested content as encrypted data;

apply, based on determining that the packet includes the encrypted data, the policy tag, including the hash value that is based on the unique ID, to a header of the packet, and output the packet towards the user device that requested the content.

4. The device of claim 3, wherein the policy tag, applied by the content provider, causes a network device to decrypt the hash value to identify the unique ID, and to determine the policy associated with the unique ID, and output the packet towards the requesting user device in accordance with the determined policy.

5. The device of claim 3, wherein the policy relates to at least one of: a Quality of Service (QoS) policy, or a QoS Class Indicator (QCI).

6. The device of claim 3, wherein executing the processor-executable instruction, to determine the policy, causes the device to determine the policy without performing deep packet inspection.

7. The device of claim 3, wherein executing the processor-executable instruction, to determine the policy, causes the device to: determine attributes of the content item based on the unique ID, and determine the policy based on the attributes.

8. A system, comprising:

a content provider device configured to:

store, in a non-transitory memory device associated with the content provider device, a plurality of content items;

store, in the non-transitory memory device associated with the content provider device, a plurality of unique identifiers that each correspond to a different content item stored by the content provider, wherein a particular one of the unique identifiers corresponds to:

a particular content item, of the plurality of content items, and a particular user device;

receive, from the particular user device, a request for content, the request specifying the particular content item;

determine a time of day associated with the request for content;

identify the particular content item and the particular user device, as indicated by the particular unique identifier associated with the particular content item and the particular user device;

generate a hash value by applying a cryptographic hash function to the unique identifier;

generate one or more packets that each include a portion of the particular content item as encrypted data;

determine, based on the one or more packets including encrypted data, that a tag should be applied to the one or more packets;

apply the tag to a header of the one or more packets that are associated with the particular content item, wherein the tag includes the generated hash value, and wherein the hash value of the tag is further associated with a policy relating to how the one or more packets should be transmitted to the particular user device; and output the one or more packets toward the particular user device; and one or more network devices configured to:

receive the one or more packets;

attempt to perform deep packet inspection ("DPI") to inspect the one or more packets;

determine, based on the attempting, that DPI cannot be used to inspect the one or more packets due to the one or more packets including encrypted data;

identify, based on determining that DPI cannot be used to inspect the one or more packets, the tag that was applied by the content provider;

decrypt the hash value included in the tag to obtain a decrypted value;

identify the policy based on:

the decrypted value obtained from the tag, and the time of day associated with the request for content; and forward the one or more packets toward the user device according to the identified policy.

9. The system of claim 8, wherein the policy includes at least one quality of service policy.

10. The system of claim 8, wherein the policy includes a queue priority policy.

11. The system of claim 8, wherein the particular user device is a first user device and the unique identifier is a first unique identifier, wherein the content provider device is configured to store a second unique identifier, that is different from the first unique identifier, that is associated with: the same particular content item, and a second user device that is different from the first user device.

12. The system of claim 8, wherein the one or more network devices are components of an Evolved Packet Core ("EPC") network.

13. The network device of claim 1, wherein the policy indicates that the particular content item should be compressed, wherein executing the processor-executable instructions further causes the network device to compress the particular content item, wherein the packet is associated with the compression of the particular content item.

14. The network device of claim 1, wherein the policy indicates a maximum or minimum bitrate at which the particular content item should be transmitted, wherein the packet is associated with the maximum or minimum bitrate, respectively.

15. The system of claim 8, wherein the policy indicates that the particular content item should be compressed, wherein when forwarding the one or more packets toward the user device according to the identified policy, the one or more network devices are further configured to apply compression to the one or more packets associated with the content item prior to forwarding the one or more packets toward the user device.

16. The system of claim 8, wherein the policy indicates a maximum or minimum bitrate at which the particular content item should be transmitted, wherein when forwarding the one or more packets toward the user device according to the identified policy, the one or more network devices are further configured to forward the one or more packets according to the maximum or minimum bitrate indicated by the policy.

17. The network device of claim 1, wherein the policy relates to a priority value for a packet queuing algorithm.

18. The device of claim 3, wherein the policy relates to a priority value for a packet queuing algorithm.

19. The device of claim 3, wherein the policy indicates that compression should be applied to the requested content.

20. The device of claim 3, wherein the device is a component of an Evolved Packet Core ("EPC") network.

* * * * *